United States Patent
Lee et al.

(10) Patent No.: US 12,368,569 B2
(45) Date of Patent: Jul. 22, 2025

(54) APPARATUS AND METHOD WITH HOMOMORPHIC ENCRYPTION

(71) Applicant: SAMSUNG ELECTRONICS CO., LTD., Suwon-si (KR)

(72) Inventors: Yongwoo Lee, Suwon-si (KR); Andrey Kim, Suwon-si (KR); Maksim Deriabin, Suwon-si (KR); Jieun Eom, Suwon-si (KR); Rakyong Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 274 days.

(21) Appl. No.: 18/301,343

(22) Filed: Apr. 17, 2023

(65) Prior Publication Data

US 2024/0121076 A1    Apr. 11, 2024

(30) Foreign Application Priority Data

Oct. 4, 2022 (KR) .................. 10-2022-0126544
Nov. 23, 2022 (KR) .................. 10-2022-0158554

(51) Int. Cl.
*H04L 9/08* (2006.01)
*H04L 9/00* (2022.01)
*H04L 9/06* (2006.01)
*H04L 9/16* (2006.01)

(52) U.S. Cl.
CPC ............ *H04L 9/008* (2013.01); *H04L 9/0618* (2013.01); *H04L 9/16* (2013.01)

(58) Field of Classification Search
CPC .......... H04L 9/008; H04L 9/0618; H04L 9/16
See application file for complete search history.

(56) References Cited

U.S. PATENT DOCUMENTS

| 10,057,057 B2 | 8/2018 | Gentry et al. |
| 2013/0170640 A1* | 7/2013 | Gentry ............... H04L 9/008 380/30 |
| 2015/0180659 A1* | 6/2015 | Youn ............... H04L 9/0861 380/44 |

(Continued)

FOREIGN PATENT DOCUMENTS

| KR | 10-2022-0120410 A | 8/2022 |
| KR | 10-2022-0121221 A | 8/2022 |

OTHER PUBLICATIONS

Chillotti et al., Concrete: Concrete Operations on Ciphertexts Rapidly Extending by TfhE, Dec. 2020, Hal Open Science, pp. 1-7 (Year: 2020).*

(Continued)

*Primary Examiner* — Ellen Tran
(74) *Attorney, Agent, or Firm* — NSIP Law

(57) ABSTRACT

An apparatus including a receiver and a processor configured to generate a modulus switch ciphertext by performing modulus switching with respect to data received by the receiver, the modulus switching including mapping a component of an input ciphertext generated from the received data to an odd number, generate a blind rotated ciphertext by performing a blind rotation operation based on the modulus switched ciphertext, and generate encrypted data, as a homomorphic encryption operation result, by performing key switching based on the blind rotated ciphertext.

20 Claims, 6 Drawing Sheets

(56) References Cited

U.S. PATENT DOCUMENTS

| | | | | |
|---|---|---|---|---|
| 2015/0358153 | A1* | 12/2015 | Gentry | H04L 9/3093 |
| | | | | 380/30 |
| 2016/0164676 | A1* | 6/2016 | Gentry | H04L 9/08 |
| | | | | 380/30 |
| 2018/0109376 | A1* | 4/2018 | Gentry | H04L 9/0838 |
| 2021/0399872 | A1* | 12/2021 | Chen | H04L 9/0631 |
| 2022/0376890 | A1 | 11/2022 | Eom et al. | |
| 2022/0385461 | A1 | 12/2022 | Eom et al. | |
| 2023/0171085 | A1 | 6/2023 | Lee et al. | |
| 2023/0246807 | A1 | 8/2023 | Lee et al. | |
| 2024/0064000 | A1* | 2/2024 | Koskas | H04L 9/008 |

OTHER PUBLICATIONS

Li et al., Homomorphic Modular Reduction and Improved Bootstrapping for BGV Scheme, 2021, Springer Nature Switzerland, pp. 466-484 (Year: 2021).*

Chillotti et al., Improved Programmable Bootstrapping with Larger Precision and Efficient Arithmetic Circuits for TFHE, 2021, International Association for Cryptographic Research, pp. 670-699 (Year: 2021).*

Micciancio, Daniele, et al. "Bootstrapping in FHEW-like cryptosystems." *Proceedings of the 9th on Workshop on Encrypted Computing & Applied Homomorphic Cryptography.* (2021). pp 1-27.

Lee, Yongwoo, et al. "Efficient FHEW bootstrapping with small evaluation keys, and applications to threshold homomorphic encryption." *Cryptology ePrint Archive* (2022). pp 1-28.

Ducas, Léo, et al. "FHEW: bootstrapping homomorphic encryption in less than a second." *Advances in Cryptology—EUROCRYPT 2015: 34th Annual International Conference on the Theory and Applications of Cryptographic Techniques, Sofia, Bulgaria*, Apr. 26-30, 2015, Proceedings, Part I 34. Springer Berlin Heidelberg, (2015). pp 1-18.

Kim, Andrey, et al. "General bootstrapping approach for RLWE-based homomorphic encryption." *Cryptology ePrint Archive* (2021). pp 1-28.

Chillotti, Ilaria, et al. "TFHE: fast fully homomorphic encryption over the torus." *Journal of Cryptology* vol. 33. Issue 1 (2020). pp 1-62.

* cited by examiner

Encryption of m: (LWE ciphertext)

$$\vec{a} \leftarrow \mathbb{Z}_N^n, e \leftarrow \chi_{err}$$
$$\beta = -\vec{a} \cdot s + e + \tfrac{1}{2}m \pmod{N}$$
$$ct = 2 \cdot (\beta, \vec{a}) + 1 \pmod{2N}$$

FIG. 5

Encryption of m: (LWE ciphertext)

$$\vec{a} \leftarrow \mathbb{Z}_{2N,\,odd}^n, e \leftarrow \chi_{err}'$$
$$\beta' = -\vec{a} \cdot s + e + m \pmod{2N}$$
$$\beta = \beta' + 1 \text{ if } \beta \text{ is even else } \beta'$$
$$ct = (\beta, \vec{a}) \pmod{2N}$$

FIG. 6

APPARATUS AND METHOD WITH HOMOMORPHIC ENCRYPTION

CROSS-REFERENCE TO RELATED APPLICATIONS

This application claims the benefit under 35 USC § 119(a) of Korean Patent Application No. 10-2022-0126544, filed on Oct. 4, 2022, and Korean Patent Application No. 10-2022-0158554, filed on Nov. 23, 2022, in the Korean Intellectual Property Office, the entire disclosures of which are incorporated herein by reference for all purposes.

BACKGROUND

1. Field

The following description relates to a method and apparatus with homomorphic encryption.

2. Description of Related Art

In the field of encryption, homomorphic encryption is a developing encryption technique that enables arbitrary operations between encrypted data. Utilizing homomorphic encryption enables arbitrary operations on encrypted data without decrypting the encrypted data Homomorphic encryption is lattice-based and thus resistant to quantum algorithms and may be considered a safe form of encryption.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, here is an apparatus including a receiver and a processor configured to generate a modulus switch ciphertext by performing modulus switching with respect to data received by the receiver, the modulus switching including mapping a component of an input ciphertext generated from the received data to an odd number, generate a blind rotated ciphertext by performing a blind rotation operation based on the modulus switched ciphertext, and generate encrypted data, as a homomorphic encryption operation result, by performing key switching based on the blind rotated ciphertext.

The processor may be further configured to generate the input ciphertext by generating a learning with errors (LWE) ciphertext based on the received data.

The processor may be further to obtain a first component and a second component of the input ciphertext based on the received data, generate a first product of the first component and a value "2", generate a second product of the second component and the value "2", and generate the input ciphertext by adding or subtracting "1" to or from the first product and the second product.

The processor may be further to obtain a first component and a second component of the input ciphertext based on the received data, determine whether the first component of the input ciphertext is even or odd, and generate the input ciphertext by adding "1" to the first component in response to the first component being determined to be an even value.

The processor may be further to obtain the second component by performing sampling from an odd set.

The processor may be further to perform the modulus switching based on determining ordering of a polynomial of the input ciphertext and a modulus of the input ciphertext.

The processor may be further to convert the component based on the determined ordering of the polynomial and the modulus of the input ciphertext and perform the modulus switching by performing a round-to-odd operation on the converted component.

The processor may be further to generate a subset of odd numbers and perform the modulus switching by mapping the component to the subset.

The processor may be further generate the subset based on determined powers of an arbitrary odd number or a multiplication result between the powers.

In a general aspect here is provided a processor implemented method including generating a modulus switch ciphertext by performing modulus switching with respect to input data, the modulus switch including by mapping a component of an input ciphertext generated from input data to an odd number, generating a blind rotated ciphertext by performing a blind rotation operation based on the modulus switched ciphertext to generate a blind rotated ciphertext, and generating encrypted data, as a homomorphic encryption operation result, by performing key switching based on the blind rotated ciphertext.

The performing of the modulus switching may include generating the input ciphertext by generating a learning with errors (LWE) ciphertext based on the input data.

The performing of the modulus switching may include obtaining a first component and a second component of the input ciphertext based on the input data, generating a first product of the first component and a value "2", generating second product of the second component and the value "2", and generating the input ciphertext by adding or subtracting "1" to or from the first product and the second product.

The performing of the modulus switching may include obtaining a first component and a second component of the input ciphertext based on the input data, determining whether the first component of the input ciphertext is even or odd, and generating the input ciphertext by adding "1" to the first component in response to the first component being determined to be an even value.

The obtaining of the first component and the second component may include obtaining the second component by performing sampling from an odd set.

The performing of the modulus switching may include performing the modulus switching based on determined ordering of a polynomial of the input ciphertext and a modulus of the input ciphertext.

The performing of the modulus switching based on the order of the polynomial of the input ciphertext and the modulus of the input ciphertext may include converting the component based on the determined ordering of the polynomial and the modulus of the input ciphertext and performing the modulus switching by performing a round-to-odd operation on the converted component.

The performing of the modulus switching may include generating a subset of odd numbers and performing the modulus switching by mapping the component to the subset.

The generating of the subset may include generating the subset based on determined powers of an arbitrary odd number or a multiplication result between the powers.

In a general aspect, here is provided a non-transitory computer-readable storage medium storing instructions that, when executed by a processor, cause the processor to perform the method.

In a general aspect, here is provided a device including a processor configured to execute a plurality of instructions and a memory storing the plurality of instructions, wherein execution of the plurality of instructions by the processor configures the processor to generate a modulus switched ciphertext by mapping a component of an input ciphertext generated from received data to an odd value, generate a blind rotated ciphertext by performing a blind rotation operation based on the modulus switched ciphertext, and performing key switching based on the blind rotated ciphertext.

Other features and aspects will be apparent from the following detailed description, the drawings, and the claims.

BRIEF DESCRIPTION OF THE DRAWINGS

FIG. 5 illustrates an example of a learning with errors (LWE) ciphertext generation method according to one or more embodiments.

FIG. 6 illustrates an example of an LWE ciphertext generation method according to one or more embodiments.

Figure 1:
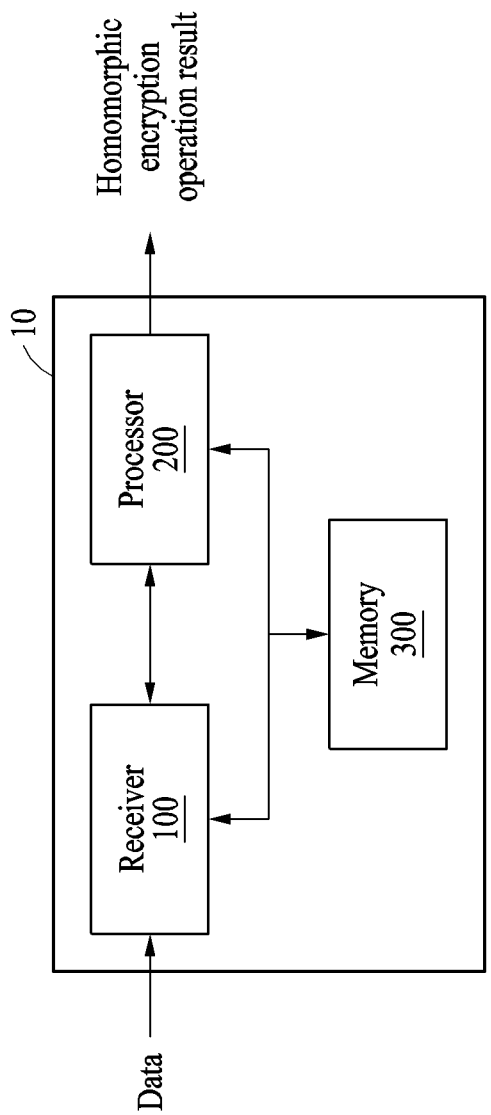
FIG. 1 illustrates an example of a homomorphic encryption operation apparatus according to one or more embodiments.

Throughout the drawings and the detailed description, unless otherwise described or provided, the same drawing reference numerals may be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences within and/or of operations described herein are merely examples, and are not limited to those set forth herein, but may be changed as will be apparent after an understanding of the disclosure of this application, except for sequences within and/or of operations necessarily occurring in a certain order. As another example, the sequences of and/or within operations may be performed in parallel, except for at least a portion of sequences of and/or within operations necessarily occurring in an order, e.g., a certain order. Also, descriptions of features that are known after an understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when a component or element is described as being "on", "connected to," "coupled to," or "joined to" another component, element, or layer it may be directly (e.g., in contact with the other component or element) "on", "connected to," "coupled to," or "joined to" the other component, element, or layer or there may reasonably be one or more other components, elements, layers intervening therebetween. When a component or element is described as being "directly on", "directly connected to," "directly coupled to," or "directly joined" to another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises," "include" or "includes," and "have" or "has" specify the presence of stated features, numbers, operations, members, elements, and/or combinations thereof, other embodiments may exist where one or more of the stated features, numbers, operations, members, elements, and/or combinations thereof are not present.

Due to manufacturing techniques and/or tolerances, variations of the shapes shown in the drawings may occur. Thus, the examples described herein are not limited to the specific shapes shown in the drawings, but include changes in shape that occur during manufacturing.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

When homomorphic encryption is typically used, a blind rotation operation technology may be used to perform arbitrary function operations on ciphertext messages in the homomorphic encryption which provides high accuracy for operation results, but has the disadvantage that the size of a public key is significantly large.

Although various typical various blind rotation operation techniques exist, a blind rotation operation still requires a lot of memory, and the amount of computation required for the typical homomorphic encryption process tends to greatly increase when the size of a public key necessary for a homomorphic encryption operation is reduced.

FIG. 1 illustrates an example of a homomorphic encryption operation apparatus according to one or more embodiments.

Referring to FIG. 1, a homomorphic encryption operation apparatus 10 may perform encryption and decryption using homomorphic encryption. In an example, the homomorphic encryption operation apparatus 10 may perform a blind rotation operation for a homomorphic encryption operation.

In a non-limiting example, the homomorphic encryption operation apparatus 10 may generate an operation result by performing a homomorphic encryption operation. The homomorphic encryption operation apparatus 10 may generate a secret key, a ciphertext, and/or a blind rotation key for performing a blind rotation operation. The homomorphic encryption operation apparatus 10 may perform a blind rotation operation using the generated secret key, ciphertext, and/or blind rotation key.

Homomorphic encryption may refer to a method of encryption configured to allow various operations to be performed on data as being encrypted. In homomorphic encryption, a result of an operation using ciphertexts may become a new ciphertext, and a plaintext obtained by decrypting the ciphertext may be the same as an operation result of the original data before the encryption.

Hereinafter, encrypted data or encrypted text may be referred to as a ciphertext. The ciphertext may be in the form of a polynomial or a vector including a polynomial.

In an example, the homomorphic encryption operation apparatus 10 may perform a ring learning with errors (RLWE) problem-based homomorphic encryption operation that supports an operation on a ciphertext into which a plaintext including a binary number is encrypted. The homomorphic encryption operation apparatus 10 may perform an RLWE problem-based homomorphic encryption operation that supports an operation on a ciphertext into which a plaintext including an integer is encrypted. The homomorphic encryption operation apparatus 10 may perform an RLWE problem-based approximate homomorphic encryption operation that supports an operation on a ciphertext into which a plaintext including a real number and/or a complex number is encrypted.

The homomorphic encryption operation apparatus 10 may derive the same result as one obtained from an operation performed on the data of a plaintext by decrypting a result obtained from an operation on the data in an encrypted state using homomorphic encryption.

In an example, the homomorphic encryption operation apparatus 10 may perform an operation on a ciphertext, and may perform a blind rotation operation (e.g., a lookup table (LUT) operation) and key generation. The homomorphic encryption operation apparatus 10 may perform an operation on a non-polynomial function using the blind rotation method in homomorphic encryption.

The homomorphic encryption operation apparatus 10 may perform an encryption process of encrypting input data in privacy-preserving machine learning (PPML) and application services. The homomorphic encryption operation apparatus 10 may be used in an encryption process of encrypting an input value in PPML and application services.

The homomorphic encryption operation apparatus 10 may eliminate limitations to space for storing a secret key, thereby adjusting the size of a vector of a secret key and increasing cryptographic safety in homomorphic encryption and application services using homomorphic encryption.

In a non-limiting example, the homomorphic encryption operation apparatus 10 may adjust a storage space for storing a key (e.g., a secret key or a blind rotation key) that is used by a server and a client and a resulting amount of computation that may be required for a homomorphic encryption operation may be reduced.

The homomorphic encryption operation apparatus 10 may be implemented in the form of a chip and mounted on a hardware accelerator that utilizes homomorphic encryption. The homomorphic encryption operation apparatus 10 may be implemented in the form of a chip or software to reduce memory usage of various operation apparatuses. In an example, the homomorphic encryption operation apparatus 10 may reduce the amount of computation for the homomorphic encryption operation, thereby reducing the overall computational demand on the server.

In an example, the homomorphic encryption operation apparatus 10 may also provide high cryptographic stability by adjusting the size of the vector of the secret key. The homomorphic encryption operation apparatus 10 may perform encryption on input data of the homomorphic encryption operation.

In an example, the processor 200 may perform mapping to an odd number in a modulus switching process, thereby improving the size of a memory 300 required for storing a public key and the amount of computation. The processor 200 may reduce the amount of computation of the client and the server, required storage space, and communication traffic.

In a non-limiting example, the homomorphic encryption operation apparatus 10 may be implemented in a personal computer (PC), a data server, or a portable device.

The portable device may be implemented as a laptop computer, a mobile phone, a smart phone, a tablet PC, a mobile internet device (MID), a personal digital assistant (PDA), an enterprise digital assistant (EDA), a digital still camera, a digital video camera, a portable multimedia player (PMP), a personal navigation device or portable navigation device (PND), a handheld game console, an e-book, or a smart device. The smart device may be implemented as a smart watch, a smart band, or a smart ring.

In an example, the homomorphic encryption operation apparatus 10 may include a receiver 100 and a processor 200. The homomorphic encryption operation apparatus 10 may further include the memory 300.

In a non-limiting example, the receiver 100 may include a receiving interface. The receiver 100 may receive data for performing a homomorphic encryption operation from the outside or from the memory 300. The data may include operand data or a key (e.g., a secret key or a blind rotation key) for performing a homomorphic encryption operation. The blind rotation key may include a ring Gentry, Sahai, Waters (RGSW) ciphertext or a ring learning with errors' (RLWE') ciphertext. The receiver 100 may output the received data to the processor 200.

The processor 200 may process data stored in the memory 300. The processor 200 may execute a computer-readable code (for example, software) stored in the memory 300 and instructions triggered by the processor 200.

The processor 200 may further execute programs, and/or may control the homomorphic encryption operation apparatus 10, and may include any one or a combination of two or more of, for example, a central processing unit (CPU), a graphic processing unit (GPU), a neural processing unit (NPU) and tensor processing units (TPUs), but is not limited to the above-described examples. The processor 200 may perform modulus switching by mapping a component of an input ciphertext generated from the data to an odd number.

The processor 200 may generate the input ciphertext by generating a learning with errors (LWE) ciphertext based on the data. The process of generating an LWE ciphertext will be described in greater detail below with reference to FIGS. 5 and 6.

In an example, the processor 200 may obtain a first component and a second component constituting the input ciphertext based on the received data. The processor 200 may generate a first multiplication result and a second multiplication result by multiplying the first component and the second component by "2". The processor 200 may generate the input ciphertext by adding or subtracting "1" to or from the first multiplication result and the second multiplication result.

The processor 200 may determine whether the first component of the input ciphertext is even or odd. The processor 200 may generate the input ciphertext by adding "1" to the first component in response to determining that the first component is even.

The processor 200 may obtain the second component by performing sampling from an odd set.

In an example, the processor 200 may perform modulus switching based on an order of a polynomial of the input ciphertext and a modulus of the ciphertext. The processor 200 may convert the component based on the order of the polynomial and the modulus of the ciphertext. The processor 200 may perform the modulus switching by performing round-to-odd on the converted component.

In an example, the processor 200 may generate a subset of odd numbers. The processor 200 may generate the subset based on powers of an arbitrary odd number or a multiplication result between the powers.

In an example, the processor 200 may perform the modulus switching by mapping the component of the ciphertext to the subset. That is, the processor 200 may perform a modulus switching operation to generate a modulus switched ciphertext.

The processor 200 may perform a blind rotation operation based on the input ciphertext on which the modulus switching is performed. That is, in an example, the blind rotation operation uses the modulus switched ciphertext to generate a blind rotated ciphertext. The processor 200 may generate a homomorphic encryption operation result by performing key switching based on a result of performing the blind rotation operation. That is, in an example, the key switching operation is based on the blind rotated ciphertext.

The memory 300 may store instructions (or programs) executable by the processor 200. For example, the instructions may include instructions for performing the operation of the processor 200 and/or an operation of each component of the processor 200.

The memory 300 may include computer-readable instructions. The processor 200 may be configured to execute computer-readable instructions, such as those stored in the memory 300, and through execution of the computer-readable instructions, the processor 200 is configured to perform one or more, or any combination, of the operations and/or methods described herein. The memory 200 may be a volatile or nonvolatile memory.

Figure 2:
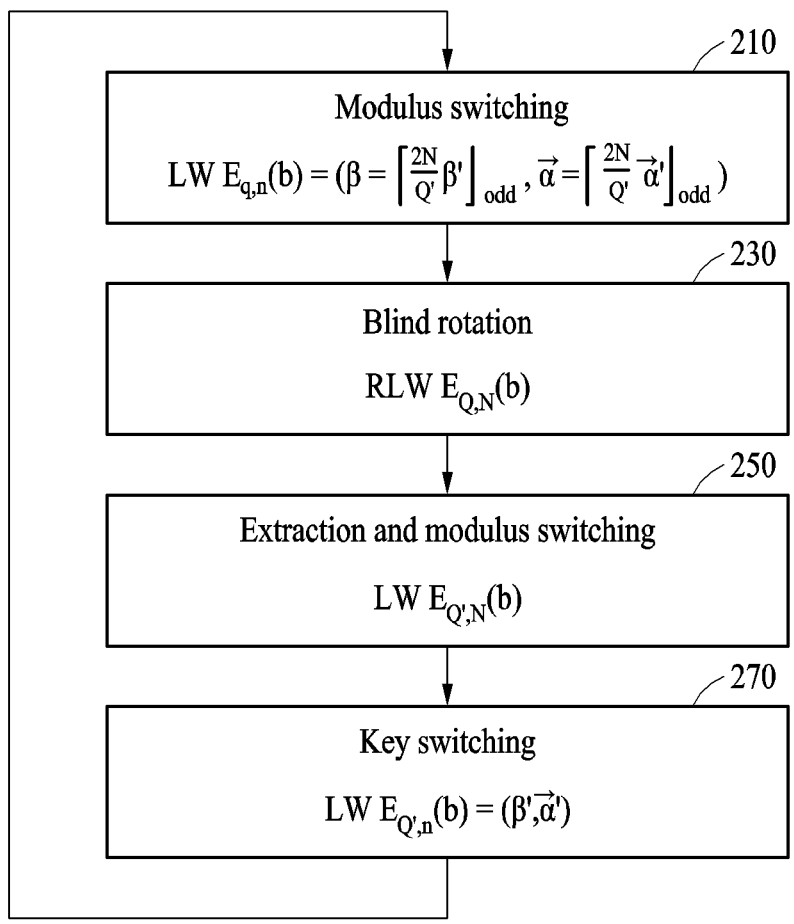
FIG. 2 illustrates an example of an operation of the homomorphic encryption operation apparatus of FIG. 1 according to one or more embodiments.

FIG. 2 illustrates an example of an operation of the homomorphic encryption operation apparatus of FIG. 1 according to one or more embodiments.

Referring to FIG. 2, a ciphertext used by a processor (e.g., the processor 200 of FIG. 1) for a homomorphic encryption operation may be defined as follows.

In an LWE ciphertext, a ciphertext of a message (or a plaintext) m may be expressed as $(\beta, \vec{\alpha}) \in Z_q^{n+1}$. The ciphertext may be decrypted as expressed by $\beta + \sum_{i=0}^{n-1} \alpha_i s_i = m+e \pmod{q}$. $\mathrm{LWE}_{\vec{s}}(m)$ may denote encryption of the message m using a secret key $\vec{s}$.

In an RLWE ciphertext, a ciphertext of the message m may be expressed as $(a,b) \in R_Q^2$. The ciphertext may be decrypted as expressed by $a \cdot z + b = m + e \pmod{Q}$. In an example, $\mathrm{RLWE}_z(m)$ may denote encryption of the message m using a secret key z.

In a non-limiting example, a RLWE ciphertext of the message m using the secret key z may be defined as expressed by Equation 1.

$$\mathrm{RLWE}(m) = (a, a \cdot z + e + m) \quad \text{Equation 1}$$

Here, a denotes a polynomial on a modulus Q, and e denotes an error polynomial with a small coefficient. When each encryption is performed, a and e may be generated at random.

In a non-limiting example, a RLWE' ciphertext of the message m for a secret key s may be defined as expressed by Equation 2.

$$\mathrm{RLWE}'(m) = (\mathrm{RLWE}(g_0 \cdot m), \mathrm{RLWE}(g_1 \cdot m), \ldots, \mathrm{RLWE}(g_{d-1} \cdot m)) \quad \text{Equation 2}$$

Here, $(g_0, g_1, \ldots, g_{d-1})$ may be a vector defined in advance for decomposing an arbitrary integer, and may be set in the form of $(1, B, B^2, \ldots, B^{d-1})$ for an arbitrary integer B or in the form of $(\overline{Q}_0 \cdot [\overline{Q}_0^{-1}]q_0, \ldots, \overline{Q}_{d-1} \cdot [\overline{Q}_{d-1}^{-1}]q_{d-1})$ for $\overline{Q}_i = q_i$.

In a non-limiting example, a RGSW ciphertext of the message m for the secret key z may be defined by two RLWE' ciphertexts as expressed by Equation 3.

$$\mathrm{RGSW}(m) = (\mathrm{RLWE}'(-zm), \mathrm{RLWE}'(m)) \quad \text{Equation 3}$$

Homomorphic encryption operations performed by the processor 200 may be defined as follows.

In an example of an automorphic operation of an RLWE ciphertext, automorphism $\psi_t$ of a polynomial ring may output $\alpha(X^t)$ with respect to an element of the polynomial ring, and the space of the domain and the space of the codomain may be the same. In the RLWE ciphertext, the processor 200 may output $(a(X^t), b(X^t)) \in R_Q^2$ with respect to an input $(a(X), b(X)) \in R_Q^2$ through the automorphic operation.

The processor 200 may obtain a ciphertext corresponding to a new secret key $z_2$ from a ciphertext corresponding to a secret key $z_1$ through a key switching operation. The processor 200 may obtain a new ciphertext $a\odot\text{RLWE}'_{z_2}(s_1)+(0, b)=(a_2,b_2)\in R_Q^2$ with $z_2$ as a secret key using a switching key $\text{RLWE}'_{z_2}(z_1)$, which is a public key, with respect to the input ciphertext $\text{RLWE}_{z_1}(u)$ $(a_1,b_1)\in R_Q^2$.

The processor 200 may perform a blind rotation operation. The processor 200 may perform a blind rotation operation with respect to the ciphertext $(\beta, \vec{\alpha})\in Z_q^{n+1}$ and an arbitrary function $f(X)\in R_Q$ using a blind rotation key, and output $$RLWE_{Q,z}\left(f \cdot Y^{\beta+\sum_{i=0}^{n-1} a_i s_i}\right) = RLWE_{Q,z}\left(f \cdot X^{\frac{2N}{q}(\beta+\sum_{i=0}^{n-1} a_i s_i)}\right).$$

The processor 200 may perform modulus switching on an LWE ciphertext $(\beta', \vec{\alpha}')\in Z_{Q'}^{n+1}$, and effectively perform a blind rotation operation using the ciphertext on which modulus switching is performed.

The processor 200 may perform modulus switching of converting a modulus of the ciphertext $(\beta', \vec{\alpha}')\in Z_{Q'}^{n+1}$ on which key switching is performed to q. In a non-limiting example, the processor 200 may perform modulus switching as expressed by Equation 4.

$$LWE_{q,n}(b) = \left(\beta = \left\lceil \frac{q}{Q'}\beta' \right\rfloor, \vec{a} = \left\lceil \frac{q}{Q'}\vec{a}' \right\rfloor\right); \quad \text{Equation 4}$$

Here, $\lceil \cdot \rfloor$ denotes a rounding operation. $\beta$ and $\vec{\alpha}$ denote components of the ciphertext. The components $\beta$ and $\vec{\alpha}$ of the ciphertext may be even or odd. The processor 200 may convert all components of the ciphertext into odd numbers to minimize the computational overhead caused in case of an even number occurring.

In operation 210, in a non-limiting example, the processor 200 may perform modulus switching as expressed by Equation 5.

$$LWE_{q,n}(b) = \left(\beta = \left\lceil \frac{2N}{Q'}\beta' \right\rfloor_{odd}, \vec{a} = \left\lceil \frac{2N}{Q'}\vec{a}' \right\rfloor_{odd}\right) \quad \text{Equation 5}$$

Here, odd denotes a round-to-odd operation, and N denotes the order of a polynomial of the ciphertext. The round-to-odd operation may refer to an operation that returns the nearest odd integer for a given real number. In the round-to-odd operation, a difference from a true value may be "1" at the maximum.

When a round-to-odd operation is performed, components of a ciphertext may have odd values. Before modulus switching is performed, the components $\beta'$ and $\vec{\alpha}'$ of a ciphertext may have values between 0 and Q'−1. After modulus switching is performed, the components $\beta$ $\vec{\alpha}$ and of the ciphertext may have values between 0 and N−1. In other words, the modulus of the ciphertext after modulus switching may be 2N.

In operation 230, in an example, the processor 200 may perform a blind rotation operation on a modulus switching result. The processor 200 may calculate $\beta+\sum_{i=0}^{n-1} \alpha_i s_i$ using a blind rotation key. The processor 200 may remove keys, such as $RGSW(X^{s_i+s_{i+1}})$ and $RGSW(X^{\Sigma s_i})$, and a multiplication operation corresponding to the keys in the blind rotation process of calculating an operation result obtained by applying a function f of $RLWE_{Q,z}(f \cdot X^{(\beta+\Sigma_{i=0}^{n-1} a_i s_i)})$ may be performed, thereby reducing the size and the amount of computation of a public key in an example.

In operation 250, the processor 200 may perform extraction and modulus switching on a blind rotation result. In operation 270, the processor 200 may perform key switching on a result of operation 250. The processor 200 may perform a homomorphic encryption operation by repeatedly performing the process of operations 210 to 270.

The processor 200 may convert the components of the ciphertext on which the blind rotation operation is performed and convert the components of the initial ciphertext into odd numbers. The processor 200 may generate the components of the initial LWE ciphertext to be odd, so that the modulus of the ciphertext may be 2N. The processor 200 may generate an LWE ciphertext having a modulus Q'(>2N), and perform round-to-odd while switching the modulus of the generated LWE ciphertext to 2N.

In other words, the processor 200 may perform an encryption so that the components of the initial LWE ciphertext may be odd. The processor 200 may generate a blind rotation key and a key switching key required for a bootstrapping process including a blind rotation operation. To perform the blind rotation operation, the processor 200 may perform round-to-odd when performing modulus switching of the ciphertext, thereby generating a ciphertext of which all components are odd and the modulus is 2N. Through the process described above, the processor 200 may efficiently calculate $RLVE_{Q,z}(f \cdot X^{(\beta+\Sigma_{i=0}^{n-1} a_i s_i)})$.

Figure 3:
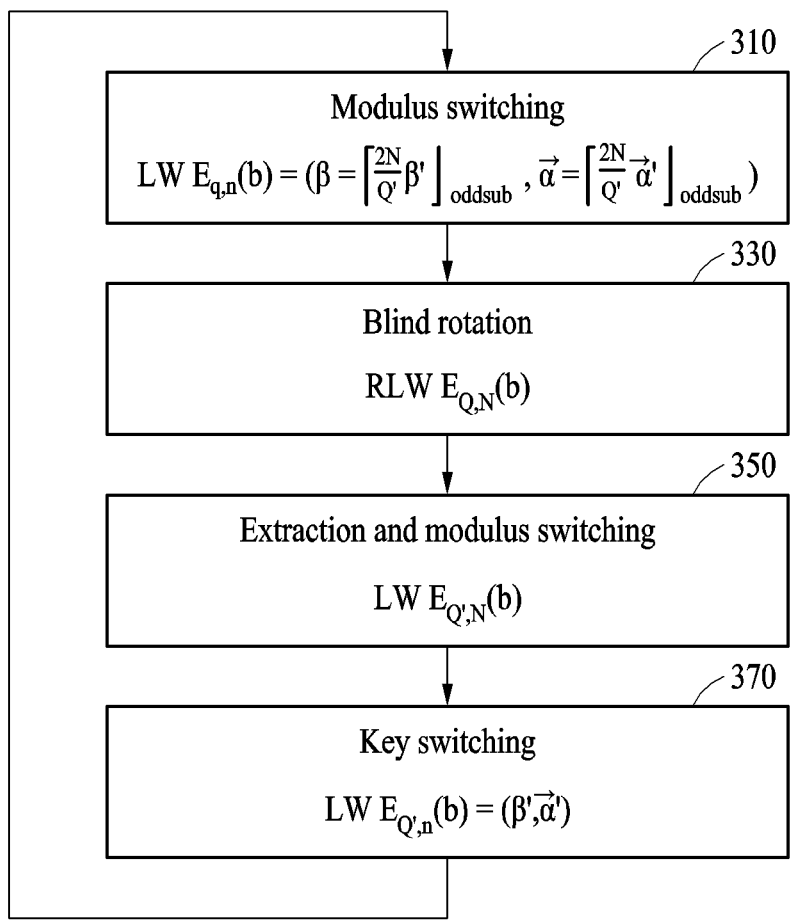
FIG. 3 illustrates an example of an operation of the homomorphic encryption operation apparatus of FIG. 1 according to one or more embodiments.

FIG. 3 illustrates an example of an operation of the homomorphic encryption operation apparatus of FIG. 1 according to one or more embodiments.

Referring to FIG. 3, a processor (e.g., the processor 200 of FIG. 1) may generate a subset of odd numbers. In an example, the processor 200 may generate the subset based on powers of an arbitrary odd number or a multiplication result between the powers. The processor 200 may perform the modulus switching by mapping the component of the ciphertext to the subset.

In operation 310, in a non-limiting example, the processor 200 may perform modulus switching based on the subset. $\lceil \cdot \rfloor_{oddsub}$ may denote an operation that returns an odd value closest to a true value in the subset. Since a subset oddsub is smaller than a superset odd, the number of automorphism keys necessary for a blind rotation operation may be reduced. In other words, the automorphism key when the set odd is used may be $\{ak_{X^k \to X}\}_{[k \in odd-\{1\}]}$, and the automorphism key when the subset is used may be $\{ak_{X^k \to X}\}_{[k \in oddsub-\{1\}]}$, which may be fewer. At this time, since the number of elements of the subset oddsub is smaller than that of the set odd, the difference between an input and an output of $\lceil \cdot \rfloor_{oddsub}$ may increase, which may cause noise. Thus, the processor 200 may determine a subset in consideration of a trade-off between key sizes and a bootstrapping failure probability.

In operation 330, the processor 200 may perform a blind rotation operation on a modulus switching result. In operation 350, the processor 200 may perform extraction and modulus switching on a blind rotation result. In operation 370, the processor 200 may perform key switching on a result of operation 350. The processor 200 may perform a homomorphic encryption operation by repeatedly performing the process of operations 310 to 370.

Figure 4:
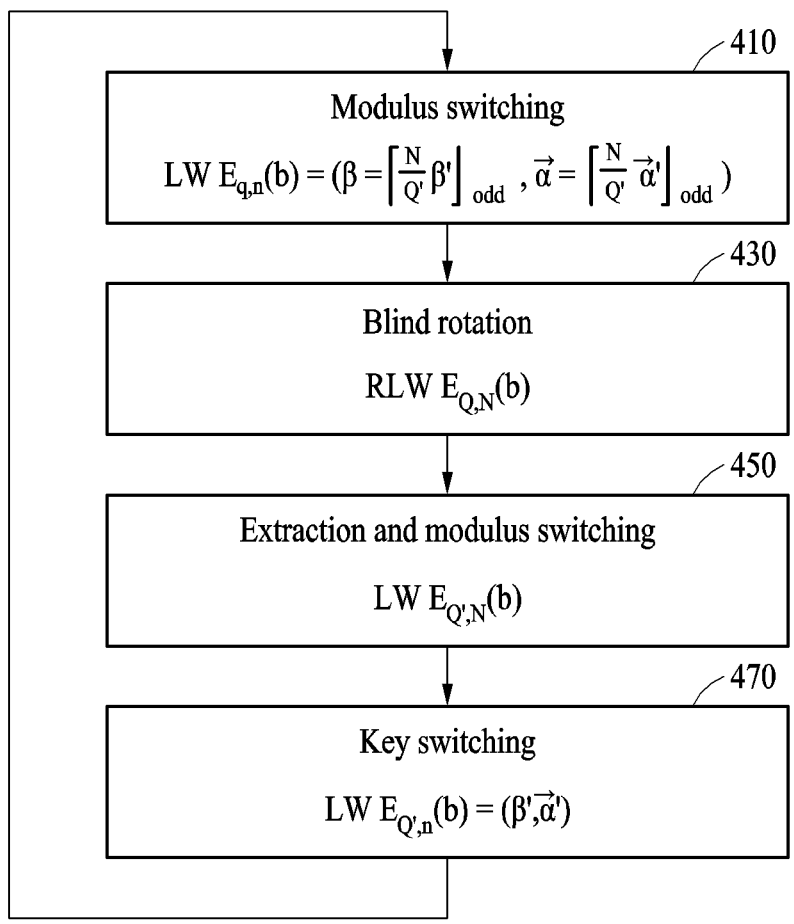
FIG. 4 illustrates an example of an operation of the homomorphic encryption operation apparatus of FIG. 1 according to one or more embodiments.

FIG. 4 illustrates an example of an operation of the homomorphic encryption operation apparatus of FIG. 1 according to one or more embodiments.

Referring to FIG. 4, in a non-limiting example, in operation 410, a processor (e.g., the processor 200 of FIG. 1) may perform modulus switching on a modulus of a ciphertext to N, rather than 2N. In other words, the processor 200 may perform modulus switching so that components of the ciphertext may be $$\left\lceil \frac{N}{Q'}\beta' \right\rfloor_{odd} \text{ and } \left\lceil \frac{N}{Q'}\vec{\alpha}' \right\rfloor_{odd},$$

and respectively.

In this case, the modulus of the ciphertext on which modulus switching is performed may be N, which is smaller than 2N. In the example of FIG. 4, in operation 430, the processor 200 may perform a blind rotation operation using $\{RGSW(X^{2s_i})\}_{[i=0, \ldots, n-1]}$ as a blind rotation key.

Although the example of FIG. 4 shows the case of N that is obtained by dividing the modulus 2N by "2", modulus switching may be performed so that the ciphertext may have a modulus that is obtained by dividing the modulus 2N by a number other than "2", in some examples. For example, when modulus switching is performed so that the ciphertext may have, as a modulus, N' that is obtained by dividing 2N by an arbitrary number, the components of the ciphertext on which modulus switching is performed may be $$\left\lceil \frac{N'}{Q'}\beta' \right\rfloor_{odd} \text{ and } \left\lceil \frac{N'}{Q'}\vec{\alpha}' \right\rfloor_{odd},$$

respectively, and in this case, the blind rotation key may be expressed as $$\left\{ RGSW\left(X^{\frac{N'}{2N}s_i}\right) \right\}_{[i=0,\ldots,n-1]}.$$

In operation 450, the processor 200 may perform extraction and modulus switching on a blind rotation result. In operation 470, the processor 200 may perform key switching on a result of operation 450. The processor 200 may perform a homomorphic encryption operation by repeatedly performing the process of operations 410 to 470.

FIG. 5 illustrates an example of an LWE ciphertext generation method according to one or more embodiments.

Referring to FIG. 5, in a non-limiting example, a processor (e.g., the processor 200 of FIG. 1) may obtain a first component and a second component constituting an input ciphertext based on received data. That is, the processor 200 may generate all components of an initial ciphertext before a blind rotation is performed to be odd. The processor 200 may generate an LWE ciphertext having a modulus of N.

The processor 200 may generate a ciphertext in which all components are odd by multiplying the components of the LWE ciphertext having a modulus of N by "2" and adding or subtracting "1" thereto or therefrom. The processor 200 may generate a first multiplication result and a second multiplication result by multiplying the first component and the second component by "2". The processor 200 may generate the input ciphertext by adding or subtracting "1" to or from the first multiplication result and the second multiplication result.

Since noise in the ciphertext generated as in the example of FIG. 5 may be greater than noise in the ciphertext having a modulus of N, the processor 200 may set parameters of the ciphertext in consideration of an error in a blind rotation operation.

FIG. 6 illustrates an example of an LWE ciphertext generation method according to one or more embodiments.

Referring to FIG. 6, in a non-limiting example, a processor (e.g., the processor 200 of FIG. 1) may determine whether a first component of an input ciphertext is even or odd. The processor 200 may generate the input ciphertext by adding "1" to the first component in response to the first component being even.

The processor 200 may obtain the first component β of the ciphertext in a manner as described in Equation 1. The processor 200 may determine whether β is even or odd. The processor 200 may add "1" thereto if β is even, and may not perform any operation if odd.

The processor 200 may obtain the second component by performing sampling from an odd set. The processor 200 may sample the second component $\vec{\alpha}$ among odd numbers.

Through the process described above, the processor 200 may generate a ciphertext that has a small error and of which all components are odd. In the example of FIG. 6, the processor 200 may use an error distribution $\chi'_{err}$ with a large value to prevent an issue of decreasing stability due to low entropy of α.

Figure 7:
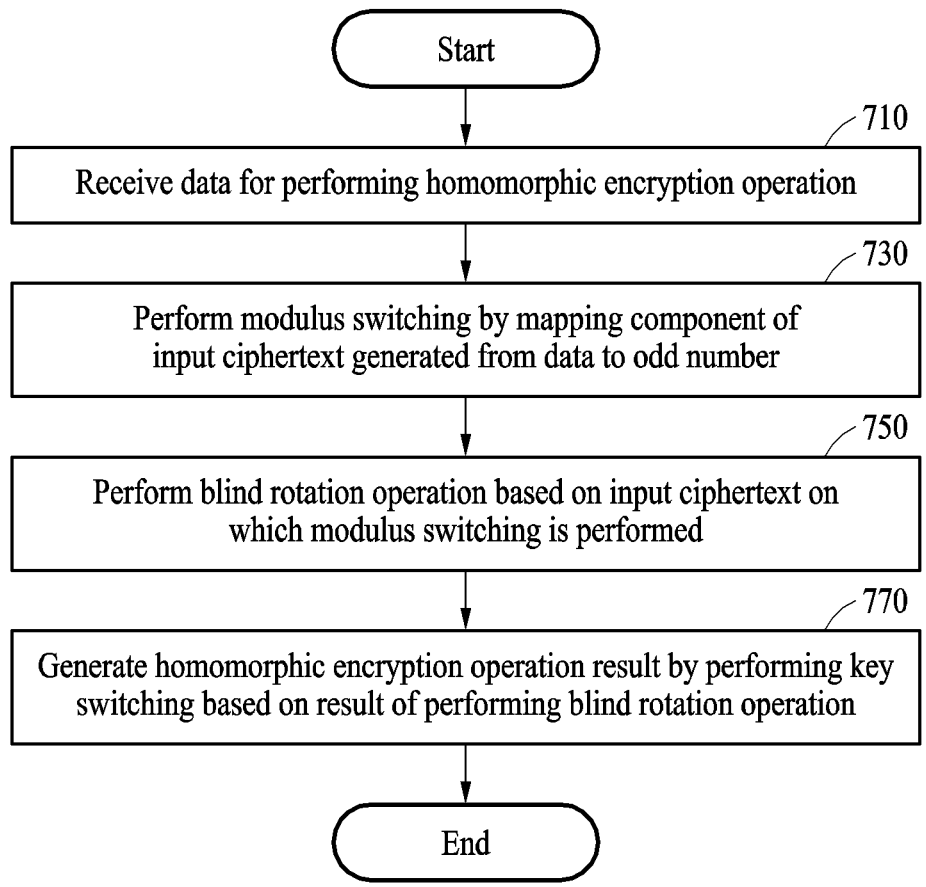
FIG. 7 illustrates an example of an operation of the homomorphic encryption operation apparatus of FIG. 1 according to one or more embodiments.

FIG. 7 illustrates an example of an operation of the homomorphic encryption operation apparatus of FIG. 1 according to one or more embodiments.

Referring to FIG. 7, in a non-limiting example, in operation 710, a receiver (e.g., the receiver 100 of FIG. 1) may receive data for performing a homomorphic encryption operation.

In operation 730, a processor (e.g., the processor 200 of FIG. 1) may perform modulus switching by mapping a component of an input ciphertext generated from the data to an odd number.

The processor 200 may generate the input ciphertext by generating an LWE ciphertext based on the data.

The processor 200 may obtain a first component and a second component constituting the input ciphertext based on the received data. The processor 200 may generate a first multiplication result and a second multiplication result by multiplying the first component and the second component by "2". The processor 200 may generate the input ciphertext by adding or subtracting "1" to or from the first multiplication result and the second multiplication result.

The processor 200 may determine whether the first component of the input ciphertext is even or odd. The processor 200 may generate the input ciphertext by adding "1" to the first component in response to the first component being even.

The processor 200 may obtain the second component by performing sampling from an odd set.

The processor 200 may perform modulus switching based on an order of a polynomial of the input ciphertext and a modulus of the ciphertext. The processor 200 may convert the component based on the order of the polynomial and the modulus of the ciphertext. The processor 200 may perform the modulus switching by performing round-to-odd on the converted component.

The processor 200 may generate a subset of odd numbers. The processor 200 may generate the subset based on powers of an arbitrary odd number or a multiplication result between the powers.

The processor 200 may perform the modulus switching by mapping the component of the ciphertext to the subset.

In operation 750, the processor 200 may perform a blind rotation operation based on the input ciphertext on which modulus switching is performed. In operation 770, the processor 200 may generate a homomorphic encryption operation result by performing key switching based on a result of performing the blind rotation operation.

The apparatuses, processors, memories, homomorphic encryption operation apparatus 10, receiver 100, processor 200, memory 300, described herein and disclosed herein described with respect to FIGS. 1-7 are implemented by or representative of hardware components. As described above, or in addition to the descriptions above, examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. As described above, or in addition to the descriptions above, example hardware components may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-7 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media, and thus, not a signal per se. As described above, or in addition to the descriptions above, examples of a non-transitory computer-readable storage medium include one or more of any of read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and/or any other device that is configured to store the instructions or software and any associated data, data files, and data structures in a non-transitory manner and provide the instructions or software and any associated data, data files, and data structures to one or more processors or computers so that the one or more processors or computers can execute the instructions.

In one example, the instructions or software and any associated data, data files, and data structures are distributed over network-coupled computer systems so that the instructions and software and any associated data, data files, and data structures are stored, accessed, and executed in a distributed fashion by the one or more processors or computers.

As used in connection with various example embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to one embodiment, the module may be implemented in a form of an application-predetermined integrated circuit (ASIC).

As used herein, the term "~unit" refers to a software or hardware component such as a field-programmable gate array (FPGA) or an application-specific integrated circuit (ASIC) and the "~unit" performs predefined functions. However, the "~unit" is not limited to software or hardware. The "~unit" may be configured to be on an addressable storage medium or configured to operate one or more processors. For example, the "~unit" may include components such as software components, object-oriented software components, class components, and task components, processes, functions, attributes, procedures, subroutines, segments of program code, drivers, firmware, microcode, circuits, data, database, data structures, tables, arrays, and variables. The functionality provided by the components and the "~unit" may be combined into fewer components and "~units" or further separated into additional components and "~units". In addition, components and "~units" may be implemented to play one or more central processing units (CPU) in a device or secure multimedia card. The "~unit" may include one or more processors.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. An apparatus, comprising:
   a receiver; and
   a processor configured to:
   generate a modulus switch ciphertext by performing modulus switching with respect to data received by the receiver, the modulus switching including mapping a component of an input ciphertext generated from the received data to an odd number;
   generate a blind rotated ciphertext by performing a blind rotation operation based on the modulus switched ciphertext; and
   generate encrypted data, as a homomorphic encryption operation result, by performing key switching based on the blind rotated ciphertext.

2. The apparatus of claim 1, wherein the processor is further configured to generate the input ciphertext by generating a learning with errors (LWE) ciphertext based on the received data.

3. The apparatus of claim 1, wherein the processor is further configured to:
   obtain a first component and a second component of the input ciphertext based on the received data,
   generate a first product of the first component and a value "2";
   generate a second product of the second component and the value "2"; and
   generate the input ciphertext by adding or subtracting "1" to or from the first product and the second product.

4. The apparatus of claim 1, wherein the processor is further configured to:
   obtain a first component and a second component of the input ciphertext based on the received data,
   determine whether the first component of the input ciphertext is even or odd, and
   generate the input ciphertext by adding "1" to the first component in response to the first component being determined to be an even value.

5. The apparatus of claim 4, wherein the processor is further configured to obtain the second component by performing sampling from an odd set.

6. The apparatus of claim 1, wherein the processor is further configured to perform the modulus switching based on determining ordering of a polynomial of the input ciphertext and a modulus of the input ciphertext.

7. The apparatus of claim 6, wherein the processor is further configured to:
   convert the component based on the determined ordering of the polynomial and the modulus of the input ciphertext, and
   perform the modulus switching by performing a round-to-odd operation on the converted component.

8. The apparatus of claim 1, wherein the processor is further configured to:
   generate a subset of odd numbers; and
   perform the modulus switching by mapping the component to the subset.

9. The apparatus of claim 8, wherein the processor is further configured to generate the subset based on determined powers of an arbitrary odd number or a multiplication result between the powers.

10. A processor implemented method, the method comprising:
    generating a modulus switch ciphertext by performing modulus switching with respect to input data, the modulus switch including by mapping a component of an input ciphertext generated from input data to an odd number;
    generating a blind rotated ciphertext by performing a blind rotation operation based on the modulus switched ciphertext to generate a blind rotated ciphertext; and
    generating encrypted data, as a homomorphic encryption operation result, by performing key switching based on the blind rotated ciphertext.

11. The method of claim 10, wherein the performing of the modulus switching comprises generating the input ciphertext by generating a learning with errors (LWE) ciphertext based on the input data.

12. The method of claim 10, wherein the performing of the modulus switching comprises:
obtaining a first component and a second component of the input ciphertext based on the input data;
generating a first product of the first component and a value "2";
generating second product of the second component and the value "2"; and
generating the input ciphertext by adding or subtracting "1" to or from the first product and the second product.

13. The method of claim 10, wherein the performing of the modulus switching comprises:
obtaining a first component and a second component of the input ciphertext based on the input data;
determining whether the first component of the input ciphertext is even or odd; and
generating the input ciphertext by adding "1" to the first component in response to the first component being determined to be an even value.

14. The method of claim 13, wherein the obtaining of the first component and the second component comprises obtaining the second component by performing sampling from an odd set.

15. The method of claim 10, wherein the performing of the modulus switching comprises performing the modulus switching based on determined ordering of a polynomial of the input ciphertext and a modulus of the input ciphertext.

16. The method of claim 15, wherein the performing of the modulus switching based on the order of the polynomial of the input ciphertext and the modulus of the input ciphertext comprises:
converting the component based on the determined ordering of the polynomial and the modulus of the input ciphertext; and
performing the modulus switching by performing a round-to-odd operation on the converted component.

17. The method of claim 10, wherein the performing of the modulus switching comprises:
generating a subset of odd numbers; and
performing the modulus switching by mapping the component to the subset.

18. The method of claim 17, wherein the generating of the subset comprises generating the subset based on determined powers of an arbitrary odd number or a multiplication result between the powers.

19. A non-transitory computer-readable storage medium storing instructions that, when executed by a processor, cause the processor to perform the method of claim 10.

20. A device, comprising:
a processor configured to execute a plurality of instructions; and
a memory storing the plurality of instructions, wherein execution of the plurality of instructions by the process configures the processor to:
generate a modulus switched ciphertext by mapping a component of an input ciphertext generated from received data to an odd value;
generate a blind rotated ciphertext by performing a blind rotation operation based on the modulus switched ciphertext; and
performing key switching based on the blind rotated ciphertext.

* * * * *